United States Patent [19]
Morgan

[11] Patent Number: 5,422,755
[45] Date of Patent: Jun. 6, 1995

[54] ULTRAVIOLET ABSORBING, FIXED TINT LENSES

[75] Inventor: David W. Morgan, Corning, N.Y.

[73] Assignee: Corning Incorporated, Corning, N.Y.

[21] Appl. No.: 217,735

[22] Filed: Mar. 25, 1994

[51] Int. Cl.⁶ .................. G02B 5/22; C03C 3/089; C03C 4/08
[52] U.S. Cl. ..................... 359/361; 501/65; 501/66; 501/72; 501/905
[58] Field of Search ............. 359/361; 501/65, 66, 501/67, 69, 70, 71, 72, 905

[56] References Cited

U.S. PATENT DOCUMENTS

| | | | |
|---|---|---|---|
| 1,292,148 | 1/1919 | Taylor | 501/64 |
| 2,219,122 | 10/1940 | Weidert et al. | 501/64 |
| 2,582,453 | 1/1952 | Pincus | 501/56 |
| 2,655,452 | 10/1953 | Barnes et al. | 501/61 |
| 2,676,109 | 4/1954 | Barnes et al. | 501/61 |
| 2,688,561 | 9/1954 | Armistead | 501/69 |
| 3,046,400 | 7/1962 | Paymal | 250/473.1 |
| 5,256,607 | 10/1993 | Kerko et al. | 501/65 |
| 5,268,335 | 12/1993 | Kerko et al. | 501/66 |
| 5,288,668 | 2/1994 | Netter | 501/65 |

*Primary Examiner*—Loha Ben
*Assistant Examiner*—Audrey Y. Chang
*Attorney, Agent, or Firm*—Milton M. Peterson; Clinton S. Janes, Jr.

[57] ABSTRACT

A transparent, ultraviolet-absorbing, fixed tint glass that is particularly useful in an ophthalmic lens and has a composition, expressed in weight percent on an oxide basis, consisting essentially of

| | | | |
|---|---|---|---|
| $SiO_2$ | 65–75 | $Al_2O_3$ | 0–2 |
| $Na_2O$ | 5–11 | $V_2O_5$ | 1.5–3.5 |
| $K_2O$ | 5–13 | $MnO_2$ | 1–4 |
| $Na_2O + K_2O$ | 14–20. | | |

14 Claims, 1 Drawing Sheet

ULTRAVIOLET ABSORBING, FIXED TINT LENSES

BACKGROUND OF THE INVENTION

Neutral gray, fixed tint sunglasses have been marketed for many years. Bausch and Lomb, Rochester, N.Y. has marketed a glass G15 since the 1940s and Corning Incorporated, Corning, N.Y. has marketed Code 8364, included within U.S. Pat. No. 2,688,561 (Armistead), since the 1950s. Corning has also manufactured a glass having a composition similar to that of G-15 under Code 8015. Analyses of 8015 and 8364, reported in terms of weight percent on the oxide basis, are recorded below.

|  | 8015 | 8364 |
| --- | --- | --- |
| $SiO_2$ | 68.41 | 65.4 |
| $Al_2O_3$ | 0.51 | 2.0 |
| $Na_2O$ | 8.81 | 7.25 |
| $K_2O$ | 9.71 | 10.6 |
| $ZnO$ | 6.76 | 13.52 |
| $Fe_2O_3$ | 5.54 | 1.7 |
| $Co_3O_4$ | 0.021 | — |
| $NiO$ | 0.126 | 0.21 |
| $As_2O_3$ | 0.111 | — |
| $TiO_2$ | — | 0.3. |

Both of those glasses appear neutral gray to the eye when viewed alone. When they are examined side-by-side, however, Code 8015 glass appears greenish gray compared to Code 8364 glass. On the other hand, Code 8364 glass assumes a brownish gray hue when viewed next to a more neutral gray; i.e., a glass having a chromaticity closer to the Illuminant.

Recently, considerable effort has been directed at developing fixed tint lenses that are ultraviolet absorbing. In particular, such efforts have been directed at achieving glass lenses that transmit no more than one percent at 380 nm; that approach a true neutral gray as determined by Illuminant C; that avoid use of divalent metal oxides, particularly, CaO and ZnO; and that are chemically strengthenable. Glass compositions and lenses resulting from these efforts are described in recently issued U.S. Pat. Nos. 5,256,607 and 5,268,335 (Kerko et al.).

The glass compositions disclosed in the -607 patent consist essentially, expressed in terms of weight percent on an oxide basis, of

| $SiO_2$ | 65–72 | $CaO$ | 0–1.5 |
| --- | --- | --- | --- |
| $B_2O_3$ | 2–6 | $Al_2O_3 + CaO$ | 0.2–2.25 |
| $Na_2O$ | 6–10 | $As_2O_3$ | 0–0.3 |
| $K_2O$ | 10–16 | $Fe_2O_3$ | 4.8–6.2 |
| $Na_2O + K_2O$ | 17–23 | $Co_3O_4$ | 0.012–0.02 |
| $K_2O:Na_2O$ | 1.25–2.25 | $NiO$ | 0.16–0.21 |
| $Al_2O_3$ | 0–2.25 | $ZnO$ | 0–1.5. |

The compositions disclosed in the -335 patent, expressed in like manner, consist essentially of

| $SiO_2$ | 55–65 | $CaO$ | 0–1.5 |
| --- | --- | --- | --- |
| $B_2O_3$ | 5–20 | $MgO$ | 0–4 |
| $Al_2O_3$ | 4–10 | $TiO_2$ | 0–4 |
| $B_2O_3 + Al_2O_3$ | 14–26 | $ZrO_2$ | 0–7 |
| $Li_2O$ | 0–3 | $MgO + TiO_2 + ZrO_2$ | 0–10 |
| $Na_2O$ | 6–18 | $As_2O_3$ | 0–0.5 |
| $K_2O$ | 2–10 | $ZnO$ | 0–1.5 |
| $Li_2O + Na_2O +$ | 13–22 | $Fe_2O_3$ | 3.5–5.5 |
| $K_2O$ |  | $Co_3O_4$ | 0.02–0.035 |
|  |  | $NiO$ | 0.08–0.2. |

These prior glasses have relied tin relatively high contents of iron oxide ($Fe_2O_3$) to obtain the desired ultraviolet absorption. For color control, the oxides of cobalt and nickel have been employed in conjunction with the iron oxide. The oxides of calcium and zinc have been minimized to facilitate chemical strengthening and for environmental purposes.

The present invention is directed at glasses that provide significantly stronger ultraviolet absorption than that now available in prior glasses that rely on a high iron content. It provides lenses that are colored by transition metal oxides, and that exhibit a variety of unique chromaticities. Finally, it provides sunglass lenses capable of being chemically strengthened, that do not require CaO or ZnO, and that have optical properties at least equal to known sunglass lenses.

SUMMARY OF THE INVENTION

Broadly, the present invention resides in transparent glasses having near-zero transmission at 380 nm, gray or brown fixed tints, and compositions consisting essentially, expressed in terms of weight percent on the oxide basis, of

| $SiO_2$ | 65–75 |  |  |
| --- | --- | --- | --- |
| $Na_2O$ | 5–11 | $V_2O_5$ | 1.5–3.5 |
| $K_2O$ | 5–13 | $MnO_2$ | 1–4 |
| $Na_2O + K_2O$ | 14–20 |  |  |
| $Al_2O_3$ | 0–2. |  |  |

The invention further resides in an ultraviolet absorbing, fixed tint, ophthalmic glass lens, the glass having a composition as defined above.

BRIEF DESCRIPTION OF THE DRAWING

In the accompanying drawing.

PRIOR ART

Figure 1:
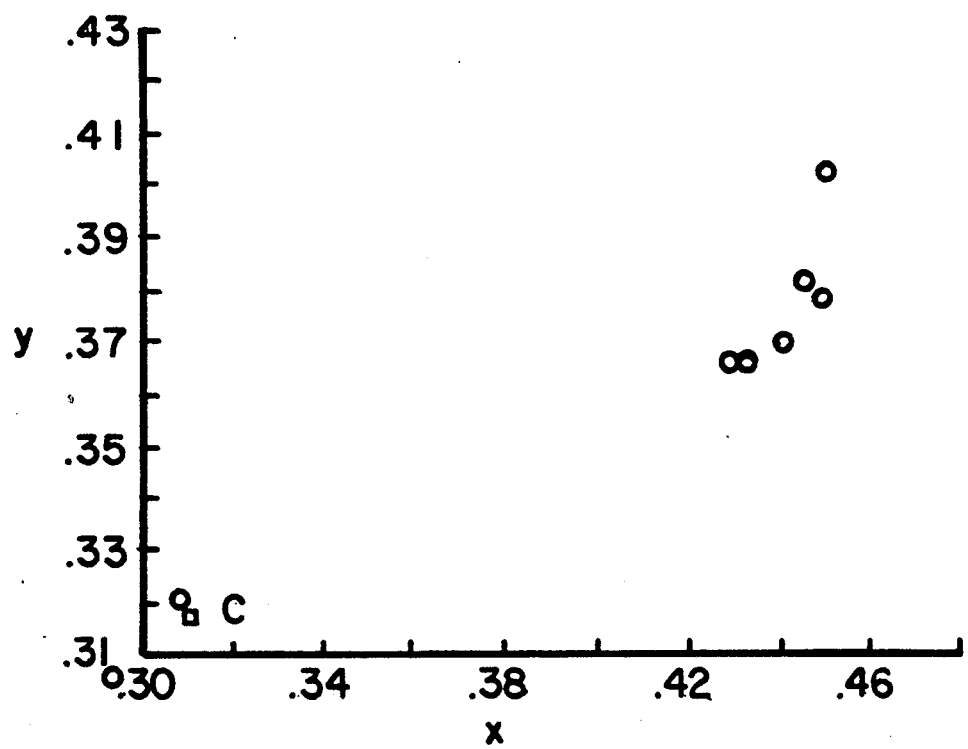
FIG. 1 is a plot of chromaticity coordinates on a color mixture diagram utilizing Illuminant C.

Prior patent literature deemed to be of possible interest, and not heretofore cited, is identified in a separate document filed herewith.

DESCRIPTION OF THE INVENTION

The present invention is based on my discovery that alkali metal silicate base glasses, containing certain transition metal oxides, exhibit superior ultraviolet absorption, as well as unique chromaticity coordinates. Such glasses may have a variety of applications. However, they are particularly useful in producing sunglass lenses.

The base glass compositions are composed of about equal amounts of the alkali metal oxides $Na_2O$ and $K_2O$, the total of such oxides being 14–20 weight percent, preferably 15–19. Minor amounts of lithia may be employed to soften the glass and facilitate chemical strengthening. However, this oxide is preferably avoided.

In addition to their well known function as modifying oxides, $Na_2O$ and $K_2O$ serve other purposes as well. $Na_2O$ is necessary where chemical strengthening is required. This is commonly the case in ophthalmic lenses. K₂O is effective in increasing refractive index. Accordingly, the present glass compositions contain 5–11% $Na_2O$ and 5–13% $K_2O$, preferably 7–9% and 8–10%, respectively. All percentages are by weight.

Likewise, minor amounts up to a total content of about 5% by weight of one or more of the alkaline earth metal oxides (RO), ZnO and PbO may be present under some circumstances. However, it is a feature of the present glasses that these oxides are not required and hence generally omitted. In particular, ZnO and PbO are recognized as posing potential environmental and health concerns. CaO is known to interfere with chemical strengthening, and is preferably avoided where such strengthening is employed.

In the absence of divalent metal oxides, up to about 2% $Al_2O_3$ may be employed to stabilize the glass and improve weathering properties. Where fining is required in the glass melting process, 0.1 up to about one percent of a fining agent, such as arsenic or antimony oxide, is employed, preferably the former.

For modifying such optical properties as refractive index, up to about 10 weight % total of one or more of the known oxides for the purpose are contemplated. These include BaO, $La_2O_3$, $Nb_2O_3$, $ZrO_2$ and $TiO_2$ in amounts up to about 8% individually.

It is a key feature of the present invention that a combination of transition metal oxides is used for ultraviolet and visual light control. In particular, a combination of $V_2O_5$ and $MnO_2$ is employed. In a glass of 2 mm thickness, this combination permits no more than about one percent total ultraviolet transmission. It provides essentially complete absorption in the UV-A region, that is, at and below 380 nm. Transmittance values below about 0.2%, and preferably below 0.1%, are here referred to as essentially complete absorption, or near zero transmittance.

A variety of different fixed tints, varying from a blue-gray to reddish-brown, may be obtained by properly selecting the relative amounts of the light control additives. To this end, $V_2O_5$ contents varying from 1.5 to 3.5%, preferably, 1.5–3.0%, are employed in conjunction with contents of 1–4% $MnO_2$, preferably 1.5–3.5%, all percentages by weight. It is also possible, by making a minor addition up to about 0.5% by weight of $Co_3O_4$, to adjust the gray color to approximate the chromaticity coordinates of Illuminant C. This closely approaches a true neutral gray. NiO, in an amount up to about 0.5% by weight, will markedly reduce the Cap Y value of the color, that is, the brightness.

The preferred glass compositions, calculated in approximate % by weight, consist essentially of

| | | | |
|---|---|---|---|
| $SiO_2$ | 65–75 | $V_2O_5$ | 1.5–3.0 |
| $B_2O_3$ | 0–6 | $MnO_2$ | 1.5–3.5 |
| $SiO_2 + B_2O_3$ | 70–75 | NiO | 0–0.5 |
| $Al_2O_3$ | 0.5–1 | $Co_3O_4$ | 0–0.5 |
| $Na_2O$ | 7–9 | | |
| $K_2O$ | 8–10. | | |

SPECIFIC EMBODIMENTS

The invention is further described with reference to specific compositions, and to the properties of glasses melted from glass batches formulated on the basis of these compositions.

TABLE I sets forth several glass compositions, together with glass properties, that illustrate the present invention. The compositions are expressed in terms of parts by weight on the oxide basis.

The sum of the individual constituents very closely approximates 100, however. For all practical purposes then, the tabulated values may be considered to reflect weight percent. The actual batch ingredients can consist of any materials, either oxides or other compounds, which, when melted together, will be converted into the desired oxide in the proper proportions. To illustrate, $Na_2CO_3$ and $K_2CO_3$ can comprise the source of $Na_2O$ and $K_2O$, respectively.

The batch ingredients were compounded, ballmilled together to aid in obtaining a homogeneous melt, and then charged into platinum crucibles. The crucibles were introduced into a furnace operating at about 1450° C., the batches melted for about four hours, the melts poured into steel molds to yield rectangular glass slabs, and those slabs transferred immediately to an annealer operating at about 520° C.

The above description of glass making reflects laboratory melting and forming practice only. It will be appreciated that glass compositions complying with the parameters of the present invention can be melted and formed in much larger amounts employing conventional commercial glass melting units and glass forming equipment and techniques. Thus, it is only necessary that glass forming batches of the required formulations be prepared, those batches fired at a temperature and for a time sufficient to secure homogeneous melts, and those melts then cooled and shaped into articles of desired configurations.

Test samples were cut from the annealed slabs. Measurements of chromaticity and transmittance, across the spectrum, were carried out on ground and polished plates of 2.0 mm cross section.

In TABLE I, T (380) indicates the percent transmittance at a wavelength of 380 nm through a 2 mm thick glass sample. The chromaticity values (Y, x, y) were also measured on a glass sample of 2 mm thickness. T (avg.) represents a measure of blue light transmission and is an average of the transmission values between 380 and 500 nm. All measurements were made employing techniques conventional in the glass art.

TABLE I

| | 1 | 2 | 3 | 4 | 5 | 6 | 7 | 8 | 9 | 10 | 11 | 12 |
|---|---|---|---|---|---|---|---|---|---|---|---|---|
| $SiO_2$ | 72.0 | 73.2 | 73.4 | 72.0 | 70.3 | 72.0 | 73.0 | 73.4 | 66.1 | 72.7 | 71.4 | 73.4 |
| $B_2O_3$ | — | — | — | — | — | — | — | — | 4.16 | — | — | — |
| $Al_2O_3$ | 0.91 | 0.91 | 0.91 | 0.91 | 0.89 | 0.91 | 0.92 | 0.91 | 1.87 | 0.92 | 0.90 | 0.91 |
| $TiO_2$ | 4.41 | 4.43 | 4.43 | 4.41 | — | — | — | 4.43 | 4.55 | 4.45 | 4.38 | 4.43 |
| $ZrO_2$ | — | — | — | — | 6.64 | — | — | — | — | — | — | — |
| CaO | — | — | — | — | — | — | 3.14 | — | — | — | — | — |
| ZnO | — | — | — | — | — | 4.49 | — | — | — | — | — | — |
| $Na_2O$ | 8.06 | 8.10 | 8.10 | 8.06 | 7.87 | 8.05 | 8.17 | 8.10 | 8.32 | 9.80 | 6.35 | 8.09 |
| $K_2O$ | 8.81 | 8.85 | 8.85 | 8.81 | 8.60 | 8.80 | 8.93 | 8.85 | 9.09 | 6.35 | 11.20 | 8.84 |
| $As_2O_3$ | 0.21 | 0.21 | — | 0.21 | 0.21 | 0.21 | 0.21 | 0.21 | 0.22 | 0.21 | 0.21 | 0.21 |

TABLE I-continued

|        | 1      | 2      | 3      | 4      | 5      | 6      | 7      | 8      | 9      | 10     | 11     | 12     |
| --- | --- | --- | --- | --- | --- | --- | --- | --- | --- | --- | --- | --- |
| $V_2O_5$ | 2.43   | 2.44   | 2.44   | 2.43   | 2.37   | 2.43   | 2.46   | 2.44   | 2.51   | 2.45   | 2.41   | 2.44   |
| $MnO_2$ | 3.10   | 1.56   | 1.56   | 3.10   | 3.02   | 3.10   | 3.14   | 1.56   | 3.20   | 3.12   | 3.07   | 1.55   |
| $Co_3O_4$ | —    | —      | 0.043  | —      | —      | —      | —      | 0.36   | —      | —      | —      | —      |
| NiO    | —      | 0.267  | —      | —      | —      | —      | —      | —      | —      | —      | —      | 0.134  |
| T(380) | 0.04   | 0.04   | 0.06   | 0.05   | 0.05   | 0.06   | 0.06   | 0.07   | 0.05   | 0.05   | 0.05   | 0.07   |
| T(Avg) | 4.26   | 4.09   | 13.25  | 4.85   | 4.87   | 5.55   | 6.26   | 15.22  | 3.61   | 4.94   | 5.84   | 8.75   |
| Y      | 16.0   | 8.1    | 15.9   | 16.90  | 16.52  | 16.50  | 17.50  | 20.46  | 22.88  | 21.05  | 16.36  | 19.56  |
| x      | 0.4552 | 0.3974 | 0.2952 | 0.4479 | 0.4486 | 0.4401 | 0.4342 | 0.3076 | 0.4710 | 0.4506 | 0.4321 | 0.3834 |
| y      | 0.3913 | 0.3680 | 0.3192 | 0.3800 | 0.3773 | 0.3687 | 0.3650 | 0.3204 | 0.4250 | 0.4007 | 0.3646 | 0.3699 |

The glass of Example 2 is unusual in that it meets all traffic signal requirements of the United States and Europe despite its low luminous transmittance. The low transmittance, and low Cap Y, are ascribed to the presence of NiO in the glass. The glasses of Examples 3 and 8 have a bluish-gray fixed tint. However, it can readily be altered to a neutral gray, or a brownish gray, by adjusting the cobalt level in the glass composition. The remaining glasses have a more reddish-brown tint than currently available in brown sunglasses, plus much better ultraviolet absorption.

TABLE II sets forth the compositions of three glasses, together with relevant properties measured on the glasses. The glasses have base compositions essentially the same as in TABLE I. They differ in that Example 13, while within the present invention, is marginal in that it has low contents of both $V_2O_5$ and $MnO_2$. As a consequence, the Transmittance values and Cap Y value are somewhat higher than desired. Example 15 has the same $V_2O_5$ content as Example 13, but no $MnO_2$ content. Example 14 has a lower $V_2O_5$ content and also no $MnO_2$. These comparative examples show dramatically the need for the combination of $V_2O_5$ and $MnO_2$ to achieve the purposes of the invention.

TABLE II

|         | 13     | 14     | 15     |
| --- | --- | --- | --- |
| $SiO_2$  | 74.4   | 76.6   | 75.8   |
| $Al_2O_3$ | 0.92  | 0.92   | 0.92   |
| $TiO_2$  | 4.46   | 4.49   | 4.48   |
| $Na_2O$  | 8.14   | 8.20   | 8.18   |
| $K_2O$   | 8.90   | 8.97   | 8.94   |
| $V_2O_5$ | 1.64   | 0.82   | 1.64   |
| $MnO_2$  | 1.56   | —      | —      |
| T(380)  | 0.15   | 4.11   | 0.40   |
| T(Avg)  | 17.23  | 68.55  | 55.81  |
| Y       | 28.3   | 88.54  | 84.02  |
| x       | 0.3758 | 0.3142 | 0.3200 |
| y       | 0.3312 | 0.3287 | 0.3417 |

TABLE III compares compositions and properties for six glasses. Examples 1 and 3 of TABLE I are compared with the two Corning commercial glasses containing high iron contents (Codes 8015 and 8364) and with examples 7 and 11 of U.S. Pat. No. 5,256,607, both high iron content glasses. Compositions are in pans by weight and property values are indicated as in TABLE I.

TABLE III

|         | −607 7 | −607 11 | 8015   | 8364   | 1      | 3      |
| --- | --- | --- | --- | --- | --- | --- |
| $SiO_2$  | 67.6   | 67.4   | 68.4   | 65.4   | 72.0   | 73.4   |
| $Na_2O$  | 6.7    | 6.75   | 8.81   | 7.25   | 8.06   | 8.10   |
| $K_2O$   | 14.5   | 14.7   | 9.71   | 10.6   | 8.81   | 8.85   |
| $Al_2O_3$ | 0.57  | 0.61   | 0.51   | 2.0    | 0.91   | 0.91   |
| $B_2O_3$ | 4.15   | 4.13   | —      | —      | —      | —      |
| CaO     | 1.05   | 0.50   | —      | —      | —      | —      |
| ZnO     | —      | —      | 6.76   | 13.5   | —      | —      |
| $As_2O_3$ | 0.18 | 0.20   | 0.11   | —      | 0.21   | —      |
| $Fe_2O_3$ | 5.06 | 5.55   | 5.54   | 1.7    | —      | —      |
| $Co_3O_4$ | 0.0135 | 0.0164 | 0.021 | —      | —      | 0.043  |
| NiO     | 0.188  | 0.189  | 0.126  | 0.21   | —      | —      |
| $TiO_2$  | —      | —      | —      | 0.3    | 4.41   | 4.43   |
| $V_2O_5$ | —      | —      | —      | —      | 2.43   | 2.44   |
| $MnO_2$  | —      | —      | —      | —      | 3.10   | 1.56   |
| CuO     | —      | —      | —      | —      | —      | —      |
| T(380)  | 0.49   | 0.81   | 1.1    | 19.9   | 0.04   | 0.06   |
| Y       | 14.5   | 15.3   | 19.0   | 19.6   | 16.0   | 15.9   |
| x       | 0.3238 | 0.3116 | 0.3108 | 0.3250 | 0.4552 | 0.2952 |
| y       | 0.3432 | 0.3251 | 0.3414 | 0.3350 | 0.3913 | 0.3192 |

In the drawings, FIG. 1 is a plot of chromaticity values (x, y) for examples 3-8, 10 and 11 of TABLE I, as well as Illuminant C. The x values are plotted along the horizontal axis and the y values along the vertical axis. As noted earlier, Examples 3 and 8 illustrate the effect of a small addition of $Co_3O_4$, whereas the remaining examples typify the browns obtained with the combination of $V_2O_5$ and $MnO_2$.

Figure 2:
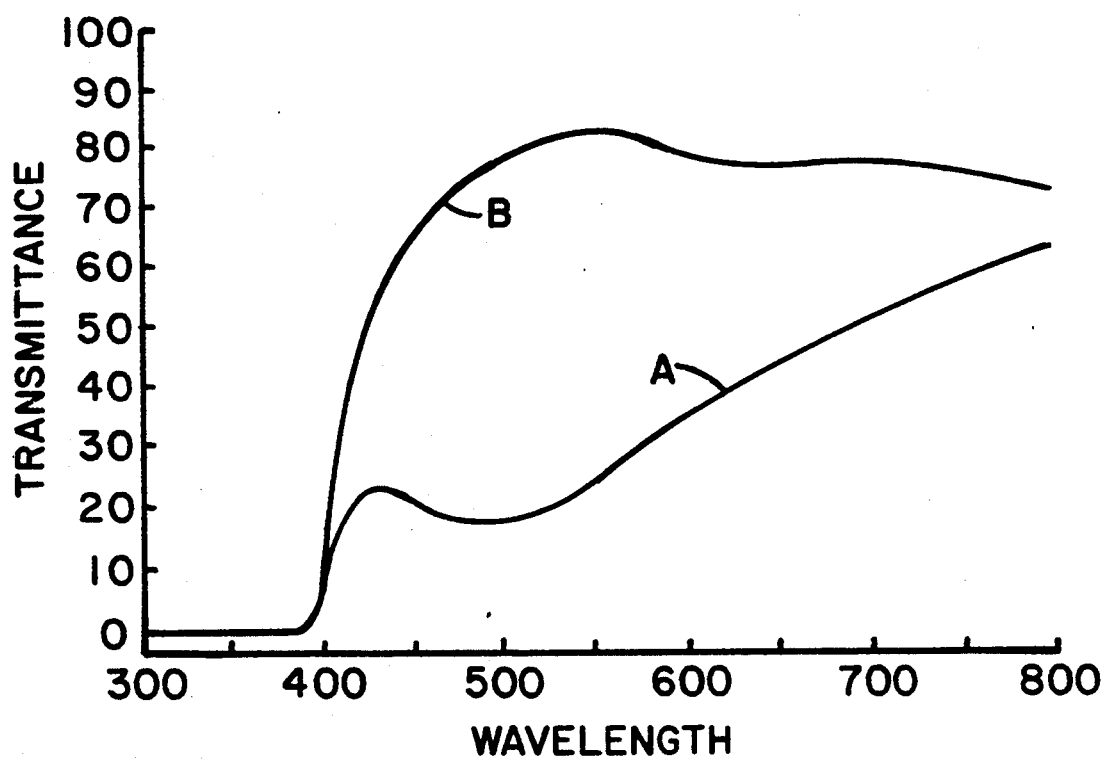
FIG. 2 is a plot of transmittance curves illustrating the invention.

FIG. 2 shows the transmittance curves for glasses having the compositions of Example 13 (curve A) and Example 15 (curve B) in TABLE II. Transmittance is plotted in percent along the vertical axis and wavelengths are plotted along the horizontal axis in nanometers. These curves clearly depict the combined effect of $V_2O_5$ and $MnO_2$, as compared to that of $V_2O_5$ alone. This comparison is in accord with that shown numerically in TABLE II.

The most preferred embodiment of the invention is dependent on the application. Thus, for traffic signal use, the glass of Example 2 is preferred. However, for a neutral gray sunglass lens, a glass containing cobalt oxide, such as that of Example 8, is preferred. For a brown, fixed tint lens, a glass, such as that of Example 5, could be preferred.

I claim:

1. A transparent glass having a near-zero transmission at a wavelength of 380 nm, a fixed tint, and a composition consisting essentially, expressed in terms of weight percent on the oxide basis, of

| $SiO_2$       | 65-75  |          |         |
| --- | --- | --- | --- |
| $Na_2O$       | 5-11   | $V_2O_5$ | 1.5-3.5 |
| $K_2O$        | 5-13   | $MnO_2$  | 1-4     |
| $Na_2O + K_2O$ | 14-20 |          |         |
| $Al_2O_3$     | 0-2.   |          |         |

2. A glass in accordance with claim 1 wherein the glass composition additionally contains at least one oxide selected from the group consisting of the alkaline earth metal oxides, PbO and ZnO, the total content of such oxides not exceeding about 5%.

3. A glass in accordance with claim 1 wherein the glass composition additionally contains up to 0.05% $Co_3O_4$ and exhibits a grayish fixed tint.

4. A glass in accordance with claim 1 wherein the glass composition additionally contains a fining agent in an amount of 0.1–1% by weight.

5. A glass in accordance with claim 1 wherein the glass composition additionally contains at least one oxide to effect an increase in refractive index, the oxide being selected from the group consisting of BaO, $La_2O_3$, $Nb_2O_3$, $ZrO_2$ and $TiO_2$ and the oxide content not exceeding 8% individually, and 10% collectively.

6. A glass in accordance with claim 1 wherein the glass composition consists essentially of

| $SiO_2$ | 65–75 | $V_2O_5$ | 1.5–3.0 |
|---|---|---|---|
| $B_2O_3$ | 0–6 | $MnO_2$ | 1.5–3.5 |
| $SiO_2 + B_2O_3$ | 70–75 | NiO | 0–0.5 |
| $Al_2O_3$ | 0.5–1 | $Co_3O_4$ | 0–0.5 |
| $Na_2O$ | 7–9 | | |
| $K_2O$ | 8–10. | | |

7. An ultraviolet-absorbing, fixed tint, ophthalmic glass lens, the glass having a composition, expressed in weight percent on an oxide basis, that consists essentially of,

| $SiO_2$ | 65–75 | $Al_2O_3$ | 0–2 |
|---|---|---|---|
| $Na_2O$ | 5–11 | $V_2O_5$ | 1.5–3.5 |
| $K_2O$ | 5–13 | $MnO_2$ | 1–4 |
| $Na_2O + K_2O$ | 14–20. | | |

8. An ophthalmic glass lens in accordance with claim 7 wherein the glass composition additionally contains at least one oxide selected from the group consisting of the alkaline earth metal oxides, PbO and ZnO, the total content of such oxides not exceeding about 5%.

9. An ophthalmic glass lens in accordance with claim 7 wherein the glass composition additionally contains up to 0.05% $Co_3O_4$ and exhibits a grayish fixed tint.

10. An ophthalmic glass lens in accordance with claim 7 wherein the glass composition additionally contains at least one oxide to effect an increase in refractive index, the oxide being selected from the group consisting of BaO, $La_2O_3$, $Nb_2O_3$, $ZrO_2$ and $TiO_2$ and the oxide content not exceeding 8% individually, and 10% collectively.

11. An ophthalmic glass lens in accordance with claim 7 wherein the glass composition consists essentially of

| $SiO_2$ | 65–75 | $V_2O_5$ | 1.5–3.0 |
|---|---|---|---|
| $B_2O_3$ | 0–6 | $MnO_2$ | 1.5–3.5 |
| $SiO_2 + B_2O_3$ | 70–75 | NiO | 0–0.5 |
| $Al_2O_3$ | 0.5–1 | $Co_3O_4$ | 0–0.5 |
| $Na_2O$ | 7–9 | | |
| $K_2O$ | 8–10. | | |

12. An ophthalmic glass lens in accordance with claim 7 wherein the glass transmittance at 380 nm is less than 0.2%.

13. An ophthalmic glass lens in accordance with claim 7 wherein the glass has an average transmittance value between 380 and 500 nm that is not over 25%.

14. An ophthalmic glass lens in accordance with claim 7 wherein the Cap Y value of the glass is not over about 35%.

* * * * *